US012645038B2

(12) United States Patent
Russert et al.

(10) Patent No.: US 12,645,038 B2
(45) Date of Patent: Jun. 2, 2026

(54) RECEPTACLE FOR A LIGHT GUIDE BUNDLE, METHOD AND INTERMEDIATE PRODUCT FOR THE PRODUCTION THEREOF

(71) Applicant: SCHOTT AG, Mainz (DE)

(72) Inventors: Hubertus Russert, Jugenheim (DE); Lukas Walter, Oestrich-Winkel (DE)

(73) Assignee: SCHOTT AG, Mainz (DE)

( * ) Notice: Subject to any disclaimer, the term of this patent is extended or adjusted under 35 U.S.C. 154(b) by 318 days.

(21) Appl. No.: 18/323,318

(22) Filed: May 24, 2023

(65) Prior Publication Data

US 2023/0384536 A1 Nov. 30, 2023

(30) Foreign Application Priority Data

May 24, 2022 (DE) ..................... 10 2022 113 107.6

(51) Int. Cl.
*G02B 6/38* (2006.01)
*G02B 6/36* (2006.01)

(52) U.S. Cl.
CPC ......... *G02B 6/3885* (2013.01); *G02B 6/3692* (2013.01); *G02B 6/3825* (2013.01)

(58) Field of Classification Search
CPC .................................................. G02B 6/3692
See application file for complete search history.

(56) References Cited

U.S. PATENT DOCUMENTS

| | | | |
|---|---|---|---|
| 2005/0254769 A1 | 11/2005 | Qui | |
| 2006/0133749 A1* | 6/2006 | Blazer ..................... | G02B 6/448 |
| | | | 385/100 |

| | | | |
|---|---|---|---|
| 2014/0241693 A1* | 8/2014 | Engel .................... | G02B 6/4248 |
| | | | 156/256 |
| 2017/0052319 A1 | 2/2017 | Schultheis | |
| 2018/0215647 A1 | 8/2018 | Ortner | |
| 2018/0252856 A1 | 9/2018 | Penkert | |
| 2019/0329251 A1 | 10/2019 | Ortner | |

FOREIGN PATENT DOCUMENTS

| | | |
|---|---|---|
| DE | 10392977 | 8/2005 |
| DE | 102017100755 | 7/2018 |
| DE | 102018100299 | 8/2018 |
| DE | 102017104398 | 9/2018 |
| DE | 102018110211 | 10/2019 |
| EP | 0707836 | 4/1996 |
| EP | 2600181 | 6/2013 |
| EP | 3936485 | 1/2022 |
| WO | 2015169685 | 11/2015 |
| WO | 2020227924 | 11/2020 |

* cited by examiner

*Primary Examiner* — Sung H Pak
(74) *Attorney, Agent, or Firm* — Ruggiero McAllister & McMahon LLC

(57) ABSTRACT

A receptacle for a plurality of light-guiding fibres is provided. The receptacle has a glass part with a first end face, a second end face, a plurality of rectilinear channels extending between the first and second end faces, and a lateral surface between the first and second end faces along a longitudinal direction. The glass part has a length defined between the first and second end faces where the length is greater than a largest transverse dimension of the glass part. The rectilinear channels are open at the first end face and/or the second end face so that the light-guiding fibres are receivable therein, respectively. The rectilinear channels have a channel length that is greater than a channel transverse dimension. The lateral surface has a parting surface thereon.

17 Claims, 8 Drawing Sheets

RECEPTACLE FOR A LIGHT GUIDE BUNDLE, METHOD AND INTERMEDIATE PRODUCT FOR THE PRODUCTION THEREOF

CROSS REFERENCE TO RELATED APPLICATIONS

This application claims benefit under 35 USC § 119 of German Application 10 2022 113 107.6 filed May 24, 2022, the entire contents of which are incorporated herein by reference.

1. FIELD OF THE INVENTION

The invention relates in general to the production of light guides. In particular, the invention relates to the termination of light guides.

2. DESCRIPTION OF RELATED ART

Typically, light guides are provided with a termination which facilitates the arrangement and fastening of the light guide for coupling light in or out. One possibility for this is to provide an end sleeve or ferrule, into which the light guide is inserted and is fixed therein. DE 10 2017 104 398 A1, for example, discloses a ferrule for terminating a light guide, which ferrule comprises two interconnected plastic parts, one part being transparent and having a channel in which the light-guiding fibre or fibres of the light guide are received. The fibres then emit their light through the plastic part, or absorb light which strikes the fibre ends through the plastic part.

WO 2015/169685 A1 discloses a light guide with an integrally formed optical element. The light guide can be designed as a rigid light guide in the form of a fibre rod or light guide rod or as a flexible light guide, the light entry and/or exit surfaces of which are adhesively bonded or hot-melted. The region of the light guide which is made of glass ends in a glass end face. An optical element made of at least one transparent plastic is integrally formed on this glass end face, ensuring that the electromagnetic radiation guided in the light guide in the operating state is guided through the glass end face into the transparent plastic of the optical element and re-emerges therefrom.

The termination of a light guide can also be combined with a signal converter in order to receive or generate the light signals. Thus, EP 2 600 181 A1 provides a method for coupling a glass fibre bundle to an optical conversion element, wherein the glass fibre bundle is introduced into a sleeve from one side, the optical conversion element is introduced from another side and the sleeve is filled with a curable transparent casting compound (14), with the result that the optical conversion element and the glass fibre bundle are embedded in the casting compound.

DE 103 92 977 T5 discloses an optical connector in which a plurality of insertion holes for introducing optical fibres is arranged at fixed intervals. Here, the accuracy of the centre distance between the adjacent insertion holes is in the range of ±0.5 µm and the parallelism of the adjacent insertion holes in the longitudinal direction is in the range of ±0.1°.

Depending on the application, it may be desirable to precisely position the individual fibres of a light guide and to keep the dimensions of the terminated light guide as small as possible at the end, thus ensuring, for example, that no significant thickening of the light guide occurs. One possible application for this is, for example, light guides for endoscopes. Other applications are also of interest here, such as arrangements of fibres for spectroscopic applications. Conventional solutions, such as thin-walled coaxial tubes, solve the problem only to a limited extent, if at all. A further problem is the handling of the correspondingly small components. Furthermore, the use of too many different materials may also be undesirable. It may therefore also be advantageous if the termination comprises the same or at least corresponding materials as or to the light-guiding fibres. Among other things, this can be advantageous in order to have temperature expansion coefficients of the fibres and end sleeve that are as similar as possible.

SUMMARY

Accordingly, the invention provides a receptacle for a plurality of light-guiding fibres of a light guide having two opposite end faces, wherein the receptacle is manufactured from a glass and has a plurality of rectilinear channels. The channels extend in the direction from one end face of the receptacle to the other end face. The direction of these channels can be parallel along the longitudinal direction of the receptacle, or else oblique with respect to the longitudinal direction. Preferably, the channels also run parallel to one another. The channels are each open at at least one of the ends, thus enabling a light-guiding fibre to be introduced into the channel. The channels have a length which is greater than the transverse dimension thereof, in particular their diameter in the case of a round cross section. Likewise, the receptacle has a length, given by the distance between the end faces, which is greater than the largest transverse dimension thereof. A preferably elongate parting surface is present on the lateral surface of the receptacle or runs thereon, this parting surface preferably being formed at least partially or in some section or sections in the form of a fracture surface. In the case of an elongate parting surface, this runs, in particular, in the longitudinal direction of the receptacle. In this way, the receptacle or end sleeve makes it possible to fix the individual fibres of a light guide individually in the channels and to arrange them in a defined manner. The parting surface is formed by detaching the receptacle from a larger glass part. This makes it easy to handle the receptacle even when the dimensions are very small. In a preferred embodiment, the receptacle is simply detached by being broken off from a larger glass part. In this case, a fracture surface is obtained as the parting surface. In a preferred embodiment, only a single parting surface is present, corresponding to a single connection to a larger glass part during manufacture. However, it is also possible for two or more such parting surfaces to be present, for example if a more stable connection to the larger glass part is to be provided during manufacture. However, it is then advantageous not to provide too many connections or parting surfaces. It is therefore particularly preferred if not more than ten parting surfaces, in particular not more than five parting surfaces, are present.

The preferred method of manufacturing such a receptacle or end sleeve is by means of a laser-supported method, in which areas of damage are introduced by means of an ultra-short-pulse laser, and the substrate pretreated in this way is subjected to an etching process, whereby the areas of damage are expanded, with the result that the substrate is finally severed at the areas of damage introduced. Corresponding methods are known in principle from DE 10 2018 100 299 A1, PCT/CN2019/086830 or EP 3 936 485 A1. A device for laser machining by means of an ultra-short-pulse laser, by means of which even finely structured contour lines can be traversed, is furthermore known from DE 10 2017 100 755 A1.

More specifically, a method for producing a receptacle according to this disclosure is provided, comprising the following steps: providing a glass plate; irradiating the glass plate with an ultra-short-pulse laser, wherein the laser beam of the ultra-short-pulse laser is focused in the glass and leaves local areas of damage there, wherein the laser beam of the ultra-short-pulse laser is moved over the glass plate along a predetermined path, with the result that mutually adjacent local areas of damage lined up along this path are introduced, and wherein subsequently the glass plate is exposed to an etching medium, with the result that the local areas of damage are expanded by the etching medium, and the glass plate is thereby divided along the path, wherein the path runs in such a way that it contains the contour of a receptacle, which is connected to a holding section via a web, and wherein a section of the glass plate is detached by the etching and division, with the result that a glass element with the holding section and the receptacle connected to the latter via the web is obtained, and wherein the receptacle is released from the holding section by dividing the web.

The receptacle is accordingly machined out of the glass plate in such a way that sections of the side faces of the glass plate form the end faces of the receptacle. After the glass plate has been machined and the section of the glass plate has been detached, an intermediate product is accordingly obtained for producing a receptacle according to this disclosure, wherein the intermediate product is in the form of a glass plate having opposite parallel side faces, wherein the intermediate product is subdivided into a holding section and a receptacle according to this disclosure, which is connected to the holding section via a web, wherein the end faces of the receptacle are formed by sections of the side faces, or wherein the end faces lie in the side faces of the intermediate product. The channels in the receptacle then consequently extend transversely to the side faces of the intermediate product, that is to say in the direction from one of the side faces to the other side face. By virtue of the connection of the receptacle to the holding section, this intermediate product allows simple handling of the small component in a particularly advantageous manner. In particular, it is also the case for the production method and the intermediate product that a plurality of receptacles can be produced and connected to the holding section in parallel. In a preferred embodiment, provision is therefore made for a plurality of receptacles to be present in the intermediate product and for each to be connected to the holding section by means of a web.

As described above, according to a preferred embodiment, the glass plate is structured by means of a method which comprises the laser-supported introduction of local areas of damage and the subsequent expansion of these areas of damage by etching. However, other methods and also other laser-supported methods, such as laser ablation, are also conceivable. More generally, this disclosure therefore also provides a production method in which a receptacle is produced by providing a glass plate and then structuring this in such a way, in a process that involves removing parts of the glass plate, that an intermediate product as described above is obtained.

The abovementioned material glass or the abovementioned glass plate is usually a soda-lime or borosilicate glass. Other special glasses are also conceivable if special chemical and/or optical requirements are important. Furthermore, it should be noted that the term glass or glass plate is also understood here to include the material quartz glass or glass ceramic, e.g., an aluminosilicate glass ceramic, as a special case.

DETAILED DESCRIPTION

Figure 1:
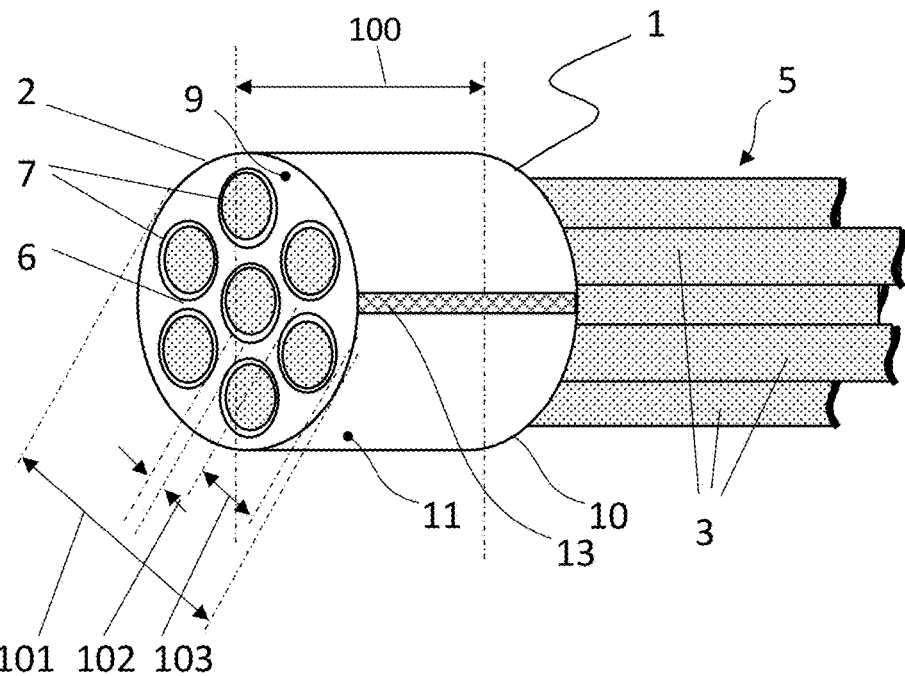
FIG. 1 shows a perspective view of a light guide which is terminated by a receptacle.

FIG. 1 shows a light guide 5 which is terminated with a receptacle 1 according to this disclosure. The receptacle 1 comprises a glass part 2 or is manufactured from a glass. The receptacle 1 preferably has a cylindrical or, more generally, a prismatic shape with two end faces 9, 10. The end faces 9, 10 are furthermore preferably oriented parallel to one another. The receptacle has a plurality of preferably rectilinear channels 7 which extend in the longitudinal direction, that is to say in the direction from end face 9 to end face 10. In order that the light-guiding fibres 3 of a light guide 5 can be introduced into the receptacle 1, the channels 7 are open towards at least one end face 9, 10. In the example illustrated, the channels 7 are open on both sides. The ends of the light-guiding fibres 3 are therefore open here, but it is also possible, for example, to provide potting with a transparent material, with the result that the light is transmitted through the transparent material. The channels 7 have an elongate shape, and therefore their length, which here also corresponds to the length 100 of the receptacle 1, is greater than their transverse dimension 103.

On the lateral surface 11 of the receptacle 1 there is an elongate parting surface 13 which, like the channels 7, runs in the longitudinal direction of the receptacle 1. This parting surface 13 is formed when the receptacle 1 is separated from an intermediate product, in which the receptacle merges into a web that is connected to a holding section. Preferably, the receptacle 1 is simply broken off from the intermediate product, with the result that the parting surface 13 has the form or characteristic topography of a fracture surface.

The receptacle 1 itself also preferably has an elongate shape, and therefore its length 100 is greater than its largest transverse dimension 101. The transverse dimension 101 of the receptacle 1 is preferably in a range of from 100 μm to 5 mm. Preferably, in particular in an embodiment in which, as in the example shown, there are no further structures in addition to the channels for the light-guiding fibres, it is at most 0.4 mm. In one example, the receptacle 1 has a cylindrical shape with a diameter of 170 μm.

According to a further embodiment, the length 100 of the receptacle 1 is generally in a range of from 0.5 mm to 5 mm, preferably in a range of from 1 mm to 2 mm.

The region between two adjacent channels 7 can be understood as wall 6. A characteristic feature of the receptacle 1 according to this disclosure is that the wall thickness 102 of the wall 6 between the channels 7 can be kept very thin. This applies especially to the ratio of the wall thickness 102 to the length 100 of the receptacle 1. According to a general embodiment, the minimum wall thickness between two adjacent channels 7 is 5 μm to 1 mm, preferably the minimum wall thickness is in a range of from 10 μm to 100 μm, and the web widths can be different between the channels or between the channels to the edge. According to yet another alternative or additional embodiment, the ratio of length 100 of the receptacle 1 to minimum wall thickness between two adjacent channels 7 can be at least 50:1. These dimensions and ratios generally do not have to apply to all the channels 7, since the channels 7 can also run with different dimensions and/or distances from one another.

The dimensions of the channels 7 also depend on the dimensions of the light-guiding fibres 3 which are to be received therein. Thus, according to a further alternative or additional embodiment, the transverse dimension 103 of a channel 7 is in a range of from 10 μm to 2 mm. In one example, channels 7 which have a diameter or, more generally, a transverse dimension of 55 μm are provided for light-guiding fibres 3 of a light guide 5 with a diameter of 50 μm. Apart from a circular cross section, the channels 7 can also have other cross-sectional shapes. Thus, the channels can have an oval, but also a substantially square or, more generally, a rectangular or polygonal shape. Typically, however, in the case of angular cross-sectional shapes, the corners are somewhat rounded on account of the etching process preferred for production.

The receptacle 1 shown in the example of FIG. 1 has a total of seven channels. Preferably, the number of channels 7 is generally in the low two-digit range, that is to say at most 50. The number of channels is preferably in a range of from 2 to 40, particularly preferably in a range of from 2 to 20.

In order to obtain a particularly compact configuration, the channels 7 can furthermore assume a hexagonal arrangement. This embodiment too is implemented in the example shown in FIG. 1.

Particularly with the laser-supported structuring method mentioned in the introduction, such structures can be produced with a high aspect ratio. This is also independent of whether production takes place on the combined structure comprising the receptacle and a structured glass plate connected thereto via a web, and therefore also independent of whether a strip-shaped parting surface 13 is present on the receptacle 1 or not. In general, irrespective of whether the parting surface 13 is present or not, there is therefore generally provision, according to a further embodiment, for a receptacle 1 for a plurality of light-guiding fibres 3 of a light guide 5, having two opposite end faces 9, 10, wherein the receptacle 1 is manufactured from a glass and has a plurality of rectilinear channels 7, wherein the channels 7 extend in the direction from one end face 9 of the receptacle 1 to the other end face 10, and wherein the channels 7 are each open at at least one of the ends 9, 10 or end faces 9, 10 of the receptacle 1, thus enabling a light-guiding fibre 3 to be introduced into the channel 7, wherein the channels 7 have a length which is greater than the transverse dimension thereof, and the receptacle 1 has a length, given by the distance between the end faces 9, 10, which is greater than the largest transverse dimension thereof, and wherein, in an advantageous embodiment, the receptacle 1 has at least one of the following features: the ratio of the area enclosed by the contour of an end face 9, 10 to the summed area of the openings 70 of the channels 7 in the end face 9, 10 is less than 3.0, the minimum wall thickness between two adjacent channels 7 is 10 μm to 100 μm, preferably at most 20 μm, the ratio of the length of the receptacle 1 to the minimum wall thickness between two adjacent channels 7 is at least 50:1, the length of the receptacle 1 is in a range of from 0.5 mm to 2.5 mm, the maximum transverse dimension of the receptacle 1, in particular the diameter, is 100 μm to 5 mm, preferably at most 0.4 mm.

Typically, the glass part 2 or the glass of the receptacle is transparent in the visible spectral range, that is to say in a range of the light wavelengths of approximately 750 nm to 400 nm. According to another embodiment, the glass part 2 or the glass of the receptacle 1 is opaque at least in a partial range of the visible spectral range from 400 nm to 750 nm. According to a more general embodiment, the opacity can also be present in at least one partial range within a wider spectral range which also includes near infrared light and UV light. According to this embodiment, the glass is opaque in at least a partial range of the spectral range from 1000 nm to 350 nm. An embodiment with an opaque glass can be very advantageous if crosstalk of light signals between the channels 7 of the receptacle 1 is to be suppressed.

Even with the method in which local areas of damage are introduced into the glass and later expanded by etching, such an opaque glass can optionally be machined. This is particularly the case if the glass is opaque in one spectral partial range but transparent in another partial range. In this case, the laser radiation can nevertheless penetrate into the volume of the glass and cause deep areas of damage in the transparent partial region.

According to an alternative or additional embodiment, it is also possible for an opaque coating to be applied at least in one section of the surface of the receptacle 1, including the inner surface of the channels 7. The term opaque glass or opaque coating is understood within the meaning of this disclosure to mean that at least 90% of the light otherwise transmitted from channel to adjacent channel is blocked. Blocking is accomplished by absorption and/or, in the case of an opaque coating, also by reflection, where applicable.

Figures 2A, 2B, 2C, 2D, 2E:
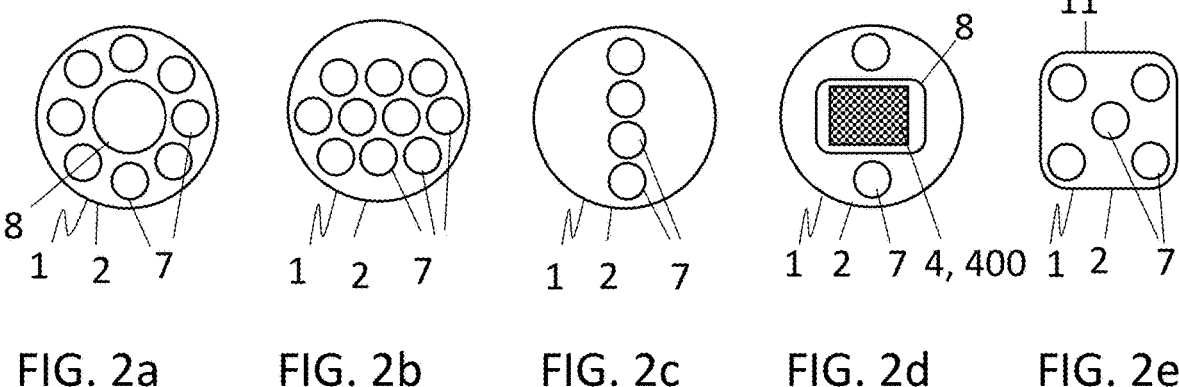
FIGS. 2a-2e show several illustrative arrangements of channels in the receptacle, each in plan view of an end face of the receptacle.

FIGS. 2a-2e show, in a plan view of one of the end faces of the receptacle 1, various examples of further arrangements and shapes of channels 7. In the embodiment of FIG. 2a, the channels 7 are distributed in an annular manner around a central channel 8. Incidentally, this is also the case in the embodiment with the seven channels according to FIG. 1. In the example of FIG. 2a, however, the arrangement of the channels 7 is otherwise not hexagonal. Moreover, the channels 7, 8 do not in principle all have to have the same transverse dimension and/or the same shape. Thus, it can be very advantageous for certain applications to provide one channel, preferably, FIG. 2a, a central channel 8, which has a larger transverse dimension, in particular a larger diameter than the other channels 7. The central channel 8 can have a different function than the surrounding channels 7. Thus, light-guiding fibres 3 which serve for illumination can be introduced into the surrounding channels 7, whereas, for example, a sensor which can receive light signals is introduced into the central channel 8.

FIG. 2b shows a further exemplary embodiment with a hexagonal arrangement of the channels 7, this receptacle having a total of ten channels 7.

In the example shown in FIG. 2c, the channels 7 are arranged linearly in a row. Such a configuration can be suitable, for example, for spectroscopic applications.

As already explained in relation to FIG. 2a, it is possible to integrate other functionalities into the receptacle, in addition to that of fixing light-guiding fibres 3. In the receptacle shown in FIG. 2d, a central channel 8 is provided, similarly to FIG. 2a. This is specifically designed to accommodate a camera 4 or at least an optical sensor, preferably a camera sensor 400. In the example, this channel 8 is also not of round design but has a rectangular cross-sectional shape with rounded corners. Unlike in FIG. 2d, this channel does not have to be a central channel 8 which is surrounded by other channels 7. Of course, other configurations are also possible, for example with an arrangement of channels 7 for the light-guiding fibres 3 and the channel for the camera 4 in adjacent fields. According to a further development, it is thus generally provided, without restriction to the example shown, that the receptacle 1 comprises a channel for receiving a camera 4 or an optical sensor, such as a camera sensor 400, in addition to at least one channel 7 for receiving a light-guiding fibre 3. The size of a camera sensor is typically 0.5×0.5 mm to 1.5×1.5 mm. Accordingly, this is then also the preferred range of the transverse dimension of the channel 7, 8 provided for the camera sensor. A configuration of the type shown in FIG. 2d is particularly suitable for the tip of an endoscope. In this case, light for illuminating the object to be examined is emitted via the light-guiding fibres 3 accommodated in the channels 7 and the object illuminated in this way is recorded with the camera 4 or the optical sensor, such as preferably a camera sensor 400. Generally, without restriction to the specific example, one embodiment therefore provides an endoscope which comprises a light guide 30 for illumination, wherein the end of the endoscope has a receptacle 1 according to this disclosure. In addition to the embodiment with the camera 4 or the camera sensor 400, it is also conceivable here for the image information likewise to be transmitted optically, for example via light-guiding fibres. Thus, it would also be possible for an image guide to be arranged in the central channel 8.

In the exemplary embodiments illustrated in the figures so far, the receptacle 1 has a substantially cylindrical basic shape. However, as already mentioned, other shapes are also possible and can also be produced in a simple manner using the production method described here. For this purpose, FIG. 2e shows an embodiment with a lateral surface with a rounded square contour.

Figures 3, 4:
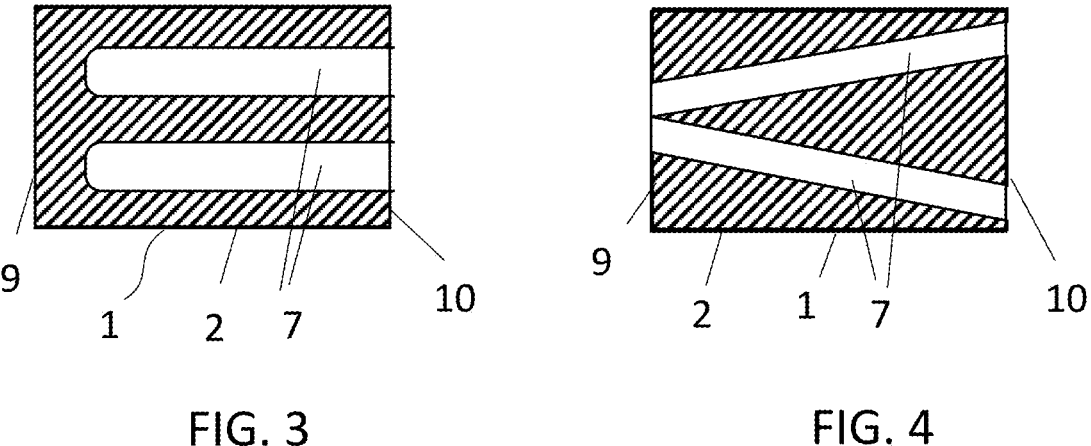
FIG. 3 shows a receptacle with channels that are not through channels.
FIG. 4 shows a receptacle with channels that run obliquely.

FIG. 3 shows a receptacle 1 in a cross-sectional view, in which the channels 7 are not through channels. Accordingly, the channels 7 are open only toward an end face 10 of the glass part 2 or the receptacle 1. In the illustration, none of the channels that are visible is a through channel, or they are all designed as blind holes. However, it is also possible for one or more of the channels 7 to be a through channel and for one or more channels 7 not to be a through channel. Accordingly, in one embodiment of the receptacle it is generally envisaged that at least one of the channels 7 is designed as a blind hole. One advantage of this arrangement is that the light-guiding fibre 3 can be glued into the blind hole and no grinding and polishing of the end faces is necessary. This can lead to cost savings. In addition, an end face is obtained which, compared to an embodiment with fibres glued into through channels, does not have any polymeric constituents but, in particular, represents a continuous glass surface.

In the example of FIG. 3, the channels 7 continue to run parallel to the longitudinal direction of the receptacle. However, it is also possible for at least one of the channels 7 to run obliquely to the longitudinal direction or longitudinal axis of the receptacle 1. In the illustrated example of FIG. 4, both channels 7 visible in sectional view run obliquely to the longitudinal axis. Furthermore, these also run obliquely to one another, in particular in the direction from one end face 10 to the other end face 9. Accordingly, independently of the specific example shown, the channels 7 can generally also be arranged in such a way that their mutual spacing changes along the longitudinal direction. Obliquely running channels 7 can be easily achieved with the above-described laser-supported method by directing the laser beam obliquely to the glass plate from which the receptacle 1 is to be produced. One application for such a receptacle is the possibility of concentrating the light emitted by the light-guiding fibres on one spatial region or, conversely, narrowing the detection region when detecting light.

Figure 5:
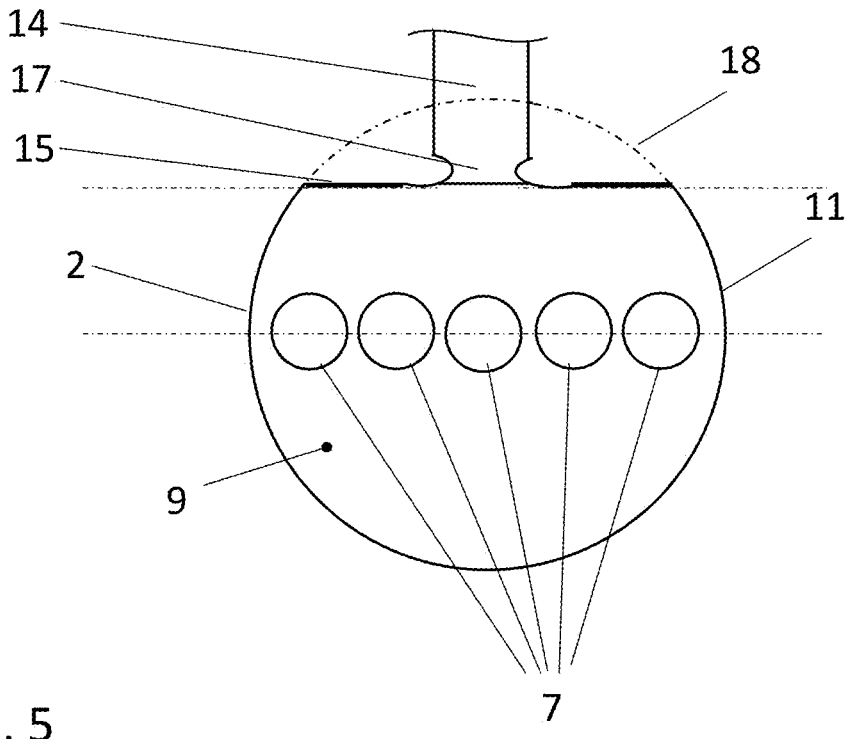
FIG. 5 shows a receptacle with a connected web in a plan view of an end face.

FIG. 5 shows a plan view of an end face 9 of a receptacle 1 with a connected web 14, as obtained by the above-described manufacturing process after the etching and detachment of a section of a glass plate. The web 14 merges into the lateral surface 11 of the receptacle 1, or is connected to the receptacle at the lateral surface 11 thereof. According to a further development, the web 14 can have a taper 17. Separation for detachment of the receptacle 1 is made easier at the taper 17. The taper 17 thus represents a predetermined breaking point. When the web 14 is severed, preferably at a taper 17 of the kind shown in FIG. 5, a receptacle 1 is obtained which has a parting surface, preferably a fracture surface, at the location of the web 14. Upon separation, part of the web 14 can remain on the receptacle 1. In this case, the parting surface is then arranged on a web 14 running in the longitudinal direction of the receptacle 1. In other words, the parting surface, preferably a fracture surface, is then located on a projection. Under certain circumstances, this may, inter alia, hinder installation in another component, such as an opening provided for this purpose in a plug connector. In order to avoid this, the lateral surface 11 can have a flattened portion 15 or depression extending in the form of a strip in the longitudinal direction of the receptacle 1, wherein the web 14 runs within the flattened portion 15 or depression, as illustrated. If the web 14 is then severed, a receptacle 1 is correspondingly obtained in which the parting surface runs within the flattened portion or depression. In general, the web 14 can then also be severed in such a way that the parting surface lies within the perimeter 18 around the contour of the cross-sectional surface of the receptacle 1, or in corresponding fashion also the contour of one of the end faces 9, 10.

Figure 6:
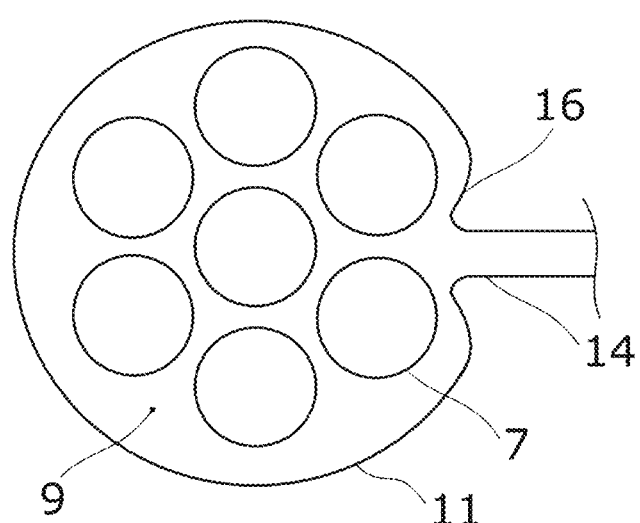
FIG. 6 shows a variant of the embodiment shown in FIG. 5.

FIG. 6 shows a variant of the example in FIG. 5. While in the example in FIG. 5 there is a flattened portion 15 on the shoulder of the web 14, there is actually a depression 16 in the embodiment in FIG. 6. In other words, the web 14 is connected to the receptacle 1 in a region in which the contour of the lateral surface 11 is concavely curved. As in the embodiment with the flattened portion 15, the depression 16 has a strip-like shape extending in the longitudinal direction of the receptacle 1.

Figures 7A, 7B, 7C:
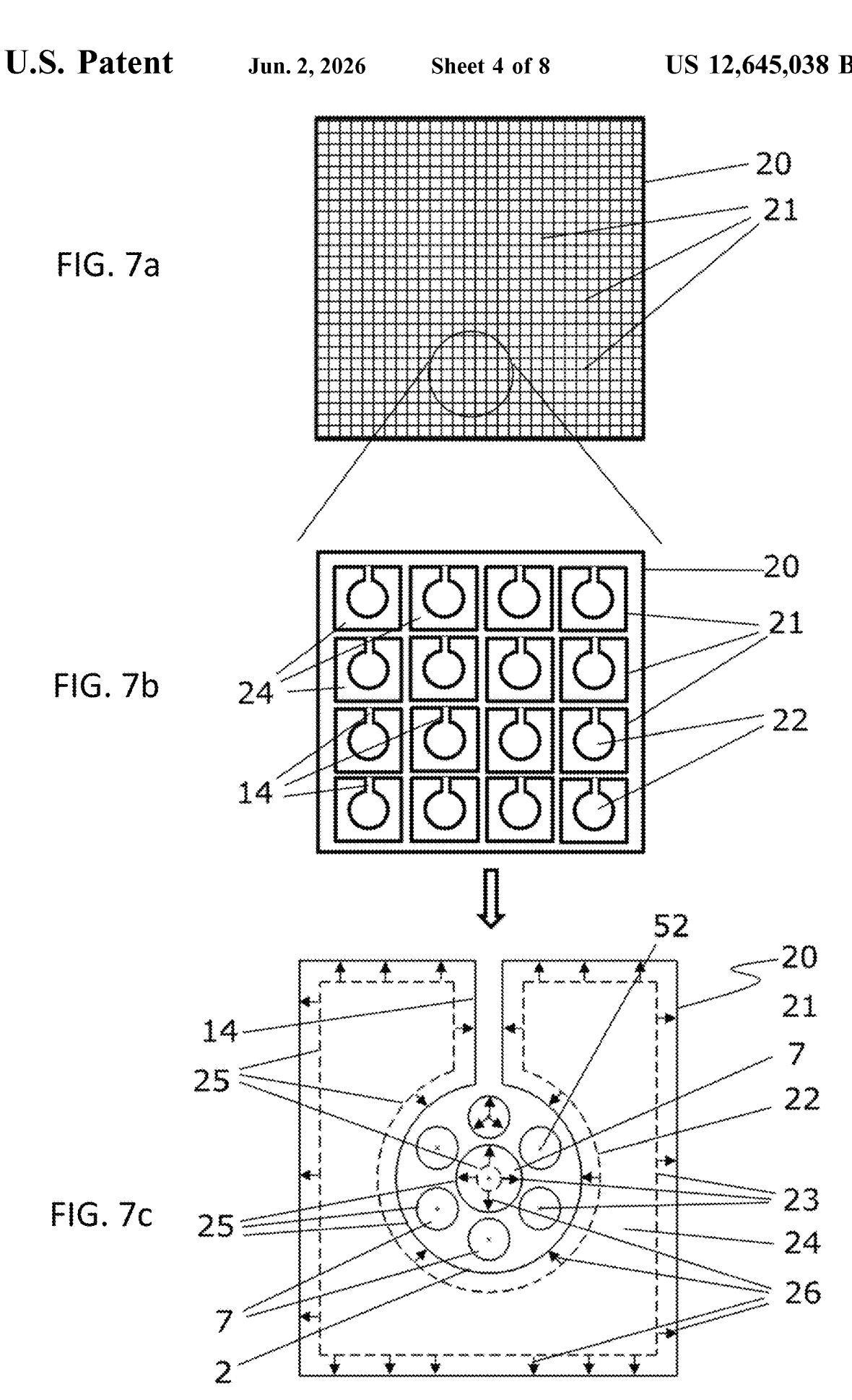
FIGS. 7a-7c show method steps for producing an intermediate product for a receptacle.

FIGS. 7a-7c show method steps for producing an intermediate product for a receptacle 1.

From a wafer which is designed as a glass plate 20, n×m wafer cells 21 are to be produced, wherein each of the wafer cells 21 contains at least one receptacle 1, which remains connected to the wafer or glass plate 20 via the web 14. The glass plate 20 is shown in FIG. 7a. At the beginning of the method, prior to the structuring of the glass plate, the wafer cells 21 are not yet present as structures. To produce the structuring, blanks 22 of the receptacles 1 are first cut out in parallel in the n×m wafer cells by means of lasers, which blanks are still connected by their webs 14 to the glass plate. The blanks 22 are each surrounded by an opening 24. Here, a wafer cell 21 is formed by an opening 24 with the respective blank 22 located therein. In contrast to the illustration, it is also conceivable for a plurality of blanks 22 to be arranged in one opening 24. In this regard, FIG. 7b shows an enlarged detail of FIG. 7a, in which a plurality of wafer cells 21 with the respective blanks 22 can be seen in the openings 24. After the blanks 22 or receptacles 1 have been cut out, they remain connected to the glass plate 20 via the web 14, while the remaining parts of the glass plate 20 form a holding section 32 for the receptacles 1.

As shown in FIG. 7c, the blanks 22 of the receptacles 1 are prepared for the subsequent etching process by initial laser machining as regards the outer contour as well as the contour and position of the channels. In this process, the dashed contour is machined with a laser, thereby introducing mutually adjacent areas of damage. For this purpose, the laser beam of an ultra-short-pulse laser is moved over the glass plate 20 along a predetermined path 23, with the result that mutually adjacent local areas of damage lined up along this path 23 are introduced. The contour to be cut out is thus not a continuous line but is formed by adjacent areas of damage, in particular in the form of holes or penetrations. This represents the starting contour 25 for the receptacle 1 or the blank 22 in the opening 24. The distance to the final contour 27 of the receptacle 1 corresponds approximately to the radius of the outer, here smaller, channels 7. In the case of the latter, only a starting hole is pierced, or only a single area of damage 52 is introduced. In the case of larger channels (here, for example, the central channel), a circle reduced by the etching distance or etching removal 26 can be traversed as a path 23. For reasons of clarity, only the etching direction or etching removal 26 relevant to the final contour 27 is visualized by means of arrows.

Typically, the etching process itself has an isotropic effect. This is the case, for example, if, as preferred, the etching is carried out by a wet chemical process. Examples of suitable etching media for this purpose are hydrofluoric acid and alkali metal hydroxide solutions, such as NaOH or KOH. The predominantly isotropic etching effect can be taken into account accordingly during the initial laser machining and the introduction of the local areas of damage 52 along the path 23. For this purpose, appropriate lead distances can be taken into account. Also conceivable are anisotropic etching processes in which the removal of material takes place in a directional manner and which are particularly common in semiconductor technology. One example of this is reactive ion etching (RIE), or plasma etching with field support. Here, the etching process takes place predominantly in a directional manner perpendicularly to the wafer surface. With such a method and corresponding masking, which is designed as an etching mask, or is applied by means of a photolithographic method as a thin photoresist layer in an intermediate step, even significantly finer structures can be produced.

Figure 8:
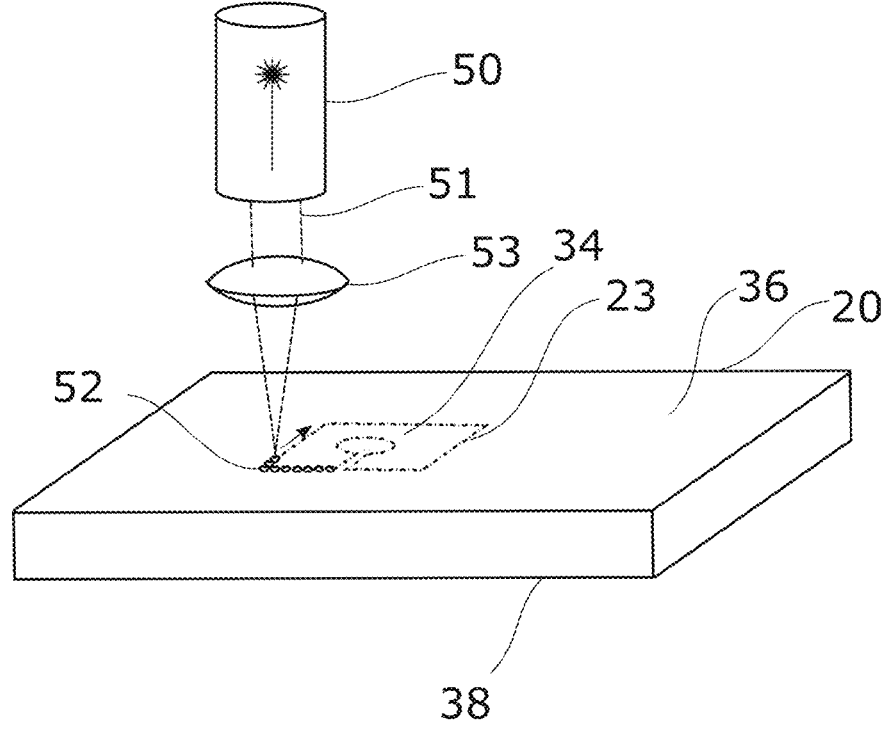
FIG. 8 shows an arrangement for introducing local areas of damage into a glass plate by means of an ultra-short-pulse laser.

In order to illustrate the preferred method for producing the receptacles 1, FIG. 8 also shows the introduction of the local areas of damage 52 by means of an ultra-short-pulse laser. A glass plate 20 or a glass wafer is provided for the method. The glass plate 20 is then irradiated with an ultra-short-pulse laser 50, wherein the laser beam 51 of the ultra-short-pulse laser 50 is focused in the glass and leaves behind local areas of damage 52 there. In the example in FIG. 8, a simple lens 53 is provided for focusing. Local areas of damage 53, which are elongate or filament-shaped, are preferably introduced. In particular, these can also extend from one side face 36 of the glass plate 20 as far as the opposite side face 38. This facilitates the action of the etching medium and therefore accelerates the separation process. In order to obtain such an elongate area of damage 52, a lens 53 with strong spherical aberration can be used, for example. As a result of the caustics produced in this way, the focus is dispersed in the beam direction. The use of an axicon is just one of many other possibilities. Such a conical prism lens can be used to form a linear focus and a Gauss-Bessel beam in the glass.

As illustrated, the laser beam 51 of the ultra-short-pulse laser 50 is moved over the glass plate 20 along a predetermined path 23, with the result that mutually adjacent local areas of damage 52 lined up along this path 23 are introduced. The direction in which the laser beam is continued is indicated in FIG. 8 by an arrow. As illustrated, the path 23 replicates the contour of a receptacle 1, which is connected to the surrounding glass plate 20 via a narrow web. In other words, the path 23 runs in such a way that it contains the contour of a receptacle 1, which is connected via a web 14 to a holding section 32. If, after complete traversal of the path and successive introduction of the areas of damage, the glass plate 20 is exposed to an etching medium, the local areas of damage 52 are expanded by the etching medium, and the glass plate 20 is thereby divided along the path 23. In the example illustrated, a section 34, which is enclosed by the path 23, is detached in this way, with the result that, as shown in the example of FIG. 7b, the receptacle 1 is located in an opening 24 produced by detaching this inner part. The receptacle can then be detached from the holding section at a later point in time.

With the etching step and the detachment of a section 34, an intermediate product is obtained which has a structure as shown in principle and by way of example in FIGS. 7a-7c.

Figure 9:
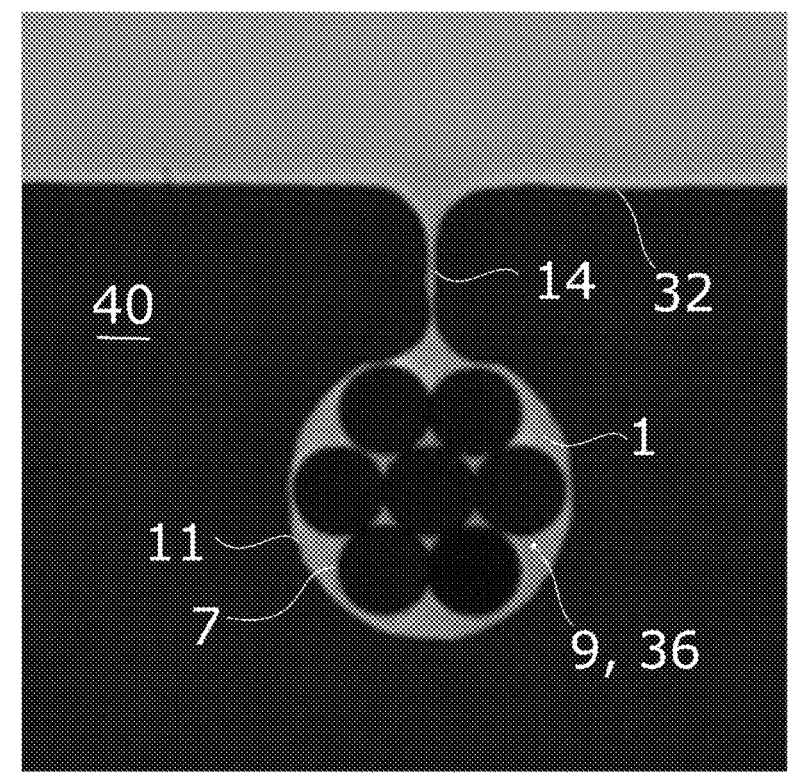
FIG. 9 and FIG. 10 show light microscope images of an intermediate product for the production of receptacles.
Figure 10:
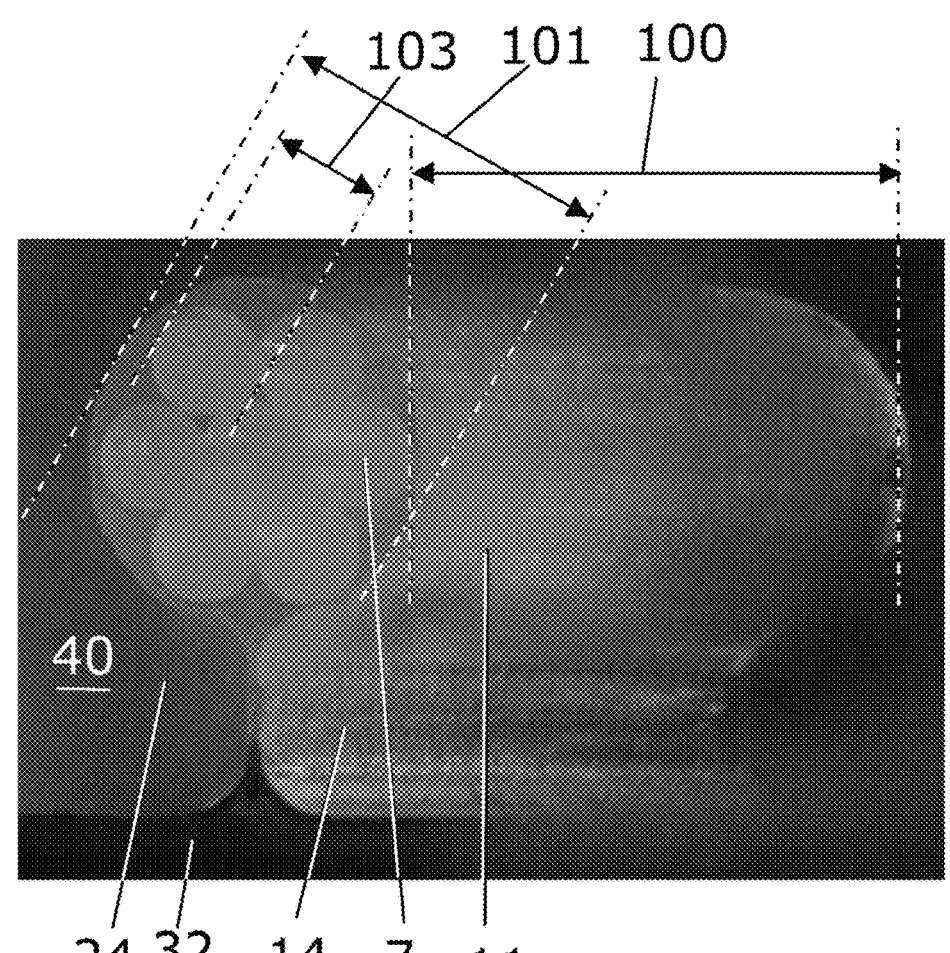

FIG. 9 and FIG. 10 show microscope images of such an intermediate product 40. FIG. 9 shows the intermediate product 40 in a plan view of one of its side faces 36, or of an end face 9 of the receptacle 1, which is of course located in the side face 36 or forms part of this side face 36. FIG. 10 shows a perspective view obliquely to the receptacle 1. As will become clear from the images, the web 14 formed can be extremely thin, thus allowing easy separation of the receptacle from the holding section 32. As mentioned, the parting surface preferably has the surface shape of a fracture surface. However, other separation methods are also conceivable. For example, the web 14 could be severed by melting due to the local action of the energy of a laser beam. In this case, the parting surface then has the shape of a strip-shaped region with a melted surface. The transverse dimension of the receptacle 1 of this example is approximately 170 μm. The thickness of the intermediate product 40 and thus also the longitudinal dimension 100 of the receptacle 1 is 2 mm. The transverse dimension, or in this case the diameter of the channels 7 by virtue of the circular cross section, is 55 μm. This enables light-guiding fibres 3 with a diameter of 50 μm to be accommodated in the channels 7.

As can be seen, in particular, with reference to FIG. 10, the lateral surface 11 of the receptacle 1 represents an etched surface with a recognizable roughness. This surface is caused by the action of the etching medium on the local areas of damage 52.

In addition to being used as a distal ferrule for endoscopes, a receptacle 1 according to this disclosure can also be used in general as a positioning aid for fibre arrangements in spectroscopy, and also in communications technology as a positioning aid for individual data transmission fibres for LED or sensor arrays.

Furthermore, the receptacle 1 and its production are not limited to particular types of glass. However, it is very advantageous to use glasses which can be readily shaped into glass plates of adjustable thickness and which, moreover, can be readily structured in order to produce an intermediate product as described above. In the following, glasses that are suitable and preferred in this respect are described.

According to one embodiment, the receptacle 1 is produced from a glass having a composition comprising the following components in % by weight:

$SiO_2$ 58 to 65
$B_2O_3$ 6 to 10.5
$Al_2O_3$ 14 to 25
MgO 0 to 3
CaO 0 to 9
BaO 3 to 8
ZnO 0 to 2.

As regards the composition, the sum of the contents of MgO, CaO and BaO is in the range of from 8 to 18% by weight. The glass is distinguished by a low or vanishingly small content of alkali oxides. In one exemplary embodiment in this connection, the glass of the receptacle 1 has the following composition in percent by weight:

$SiO_2$ 61
$B_2O_3$ 10
$Al_2O_3$ 18
MgO 2.8
CaO 4.8
BaO 3.3.

The following properties are obtained with this composition:

$\alpha(20-300)$ $3.2 \cdot 10^{-6}/K$
$T_g$ 717° C.
Density 2.43 $g/cm^3$.

According to a further embodiment, the receptacle is produced from a soda-lime glass. In a further development of this embodiment, the glass has a composition which contains the following components in % by weight:

$SiO_2$ 55 to 75
$Na_2O$ 0 to 15
$K_2O$ 2 to 14
$Al_2O_3$ 0 to 15
MgO 0 to 4
CaO 3 to 12
BaO 0 to 15
ZnO 0 to 5
$TiO_2$ 0 to 2.

In a further embodiment of a receptacle 1 with a glass body 2 made of soda-lime glass, this glass has the following components in % by weight:

$SiO_2$ 69+/−5
$Na_2O$ 8+/−2

$K_2O$ 8+/−2
CaO 7+/−2
BaO 2+/−2
ZnO 4+/−2
$TiO_2$ 1+/−1
$SiO_2$ 80+/−5
$B_2O_3$ 13+/−5
$Al_2O_3$ 2.5+/−2
$Na_2O$ 3.5+/−2
$K_2O$ 1+/−1.

With this composition, the following properties of the glass can be obtained:

$\alpha(20-300)$ $3.25 \cdot 10^{-6}/K$
$T_g$ 525° C.
Density 2.2 $g/cm^3$.

The glass is distinguished, among other things, by the fact that it can be readily shaped into glass plates by floating.

According to a second embodiment of a borosilicate glass, the glass of the receptacle 1 has a composition with the following components in percent by weight:

$SiO_2$ 64.0
$B_2O_3$ 8.3
$Al_2O_3$ 4.0
$Na_2O$ 6.5
$K_2O$ 7.0
ZnO 5.5
$TiO_2$ 4.0
$Sb_2O_3$ 0.6
$Cl^-$ 0.1.

With this composition, the following properties of the glass can be obtained:

$\alpha(20-300)$ $7.2 \cdot 10^{-6}/K$
Tg 557° C.
Density 2.5 $g/cm^3$.

As mentioned at the outset, purely quartz-based materials or, in particular transparent, glass ceramics are also conceivable.

Figures 11, 12:
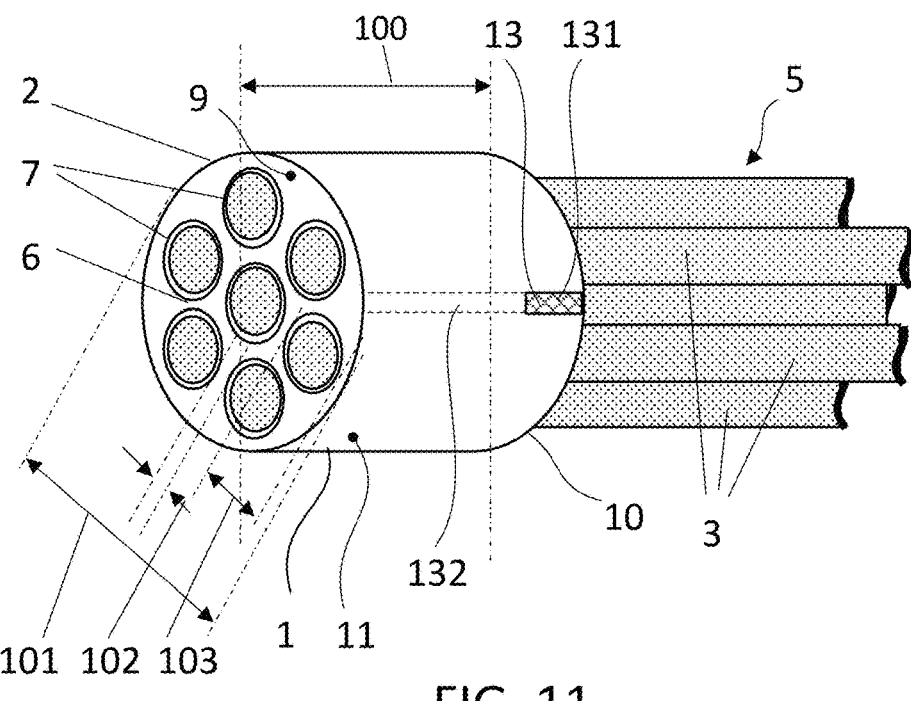
FIG. 11 shows a variant of the embodiment shown in FIG. 1.
FIG. 12 shows a light microscope image of a receptacle in side view.

FIG. 11 shows a variant of the example illustrated in FIG. 1. In the embodiments described so far, in particular as shown in FIG. 1, the parting surface 13 extends along the entire length of the receptacle 1, i.e., from one end face 9 to the other end face 10. Accordingly, the web 14, by means of which the receptacle 1 is connected to the holding section 32 of the glass plate 20, is then also essentially exactly the same length as the receptacle 1. However, this may make it more difficult to detach the receptacle 1 from the glass plate 20. In addition, the receptacle 1 can be of very delicate design, and its wall thicknesses can thus be similar to the thickness of the web 14, at least in some region or regions. It may therefore be the case that the receptacle 1 will be damaged by the applied force during separation. In order to make separation even easier, provision can therefore be made, in a further development of the receptacle 1 according to this disclosure, for the parting surface 13 to comprise a fracture surface 131 which extends along only part of the length of the receptacle 1. In other words, the length of the fracture surface 131, measured in the longitudinal direction of the receptacle 1, is less than the longitudinal dimension 100 of the receptacle 1. One example of this is shown in the variant of the embodiment of FIG. 1 shown in FIG. 11. As can be seen, the fracture surface 131 is significantly shorter than the receptacle 1. However, as in the embodiment of FIG. 1, the fracture surface 131 can have an elongate shape which extends along the longitudinal direction of the receptacle 1. Here, the aspect ratio of the width of the fracture surface to its length is preferably at least 1:3, particularly preferably at least 1:10. In general, the length of the fracture surface 131 is furthermore at least 100 μm in a preferred embodiment, even where the length is shorter than the length of the receptacle 1. If, therefore, the length of the fracture surface 131 is 100 μm and the length of the receptacle 1 is 1 mm, for example, the fracture surface 131 accordingly extends over ¹⁄₁₀ of the length of the receptacle 1. The parting surface 13 can furthermore also have a parting surface section 132 which is not a fracture surface 131. For example, such a parting surface 13 can be obtained by first producing an intermediate product 40 in the form of a glass plate 20 of the kind shown in FIG. 10, and then severing the web 14 partially, for example by grinding or more generally by an abrasive method, thus shortening the web length. In this case, the parting surface section 132 is designed as a preferably elongate ground surface.

In a preferred embodiment, however, there is no further section of the parting surface 13 apart from one or possibly also several fracture surfaces 131 present. In other words, in this case the parting surface 13 is thus formed by a fracture surface 131, the length of which, measured in the longitudinal direction of the receptacle 1, is shorter than the longitudinal dimension 100 of the receptacle.

It is furthermore preferred that, in the case of such a fracture surface 131 shortened with respect to the length of the receptacle 1, the said fracture surface adjoins one of the end faces 9, of the receptacle, or starts from an end of the receptacle 1 defined by an end face 9, 10. This is advantageous, inter alia, in order to have a longer lever for breaking off the receptacle.

Figures 13A, 13B:
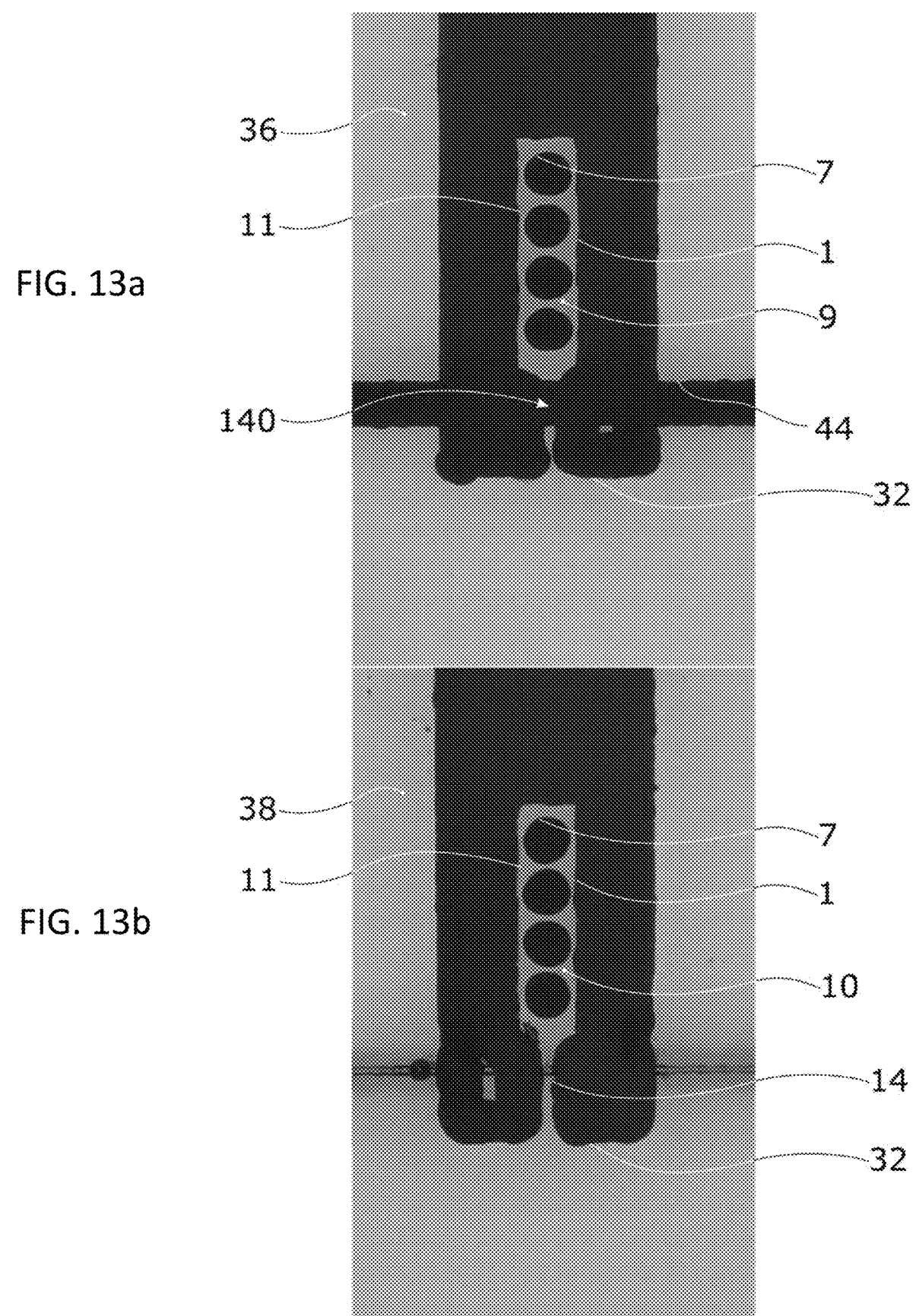
FIGS. 13a-13b show light microscope images with an intermediate product in plan view of the end faces of the receptacles.

FIG. 12 shows a light microscope image of a rectangular receptacle 1, for example according to or similar to FIGS. 13a-b. The receptacle 1 has a length of 1043 μm and a transverse dimension or length of an edge of 388 μm. By breaking off the receptacle 1 from a web 14, as can also be seen in the example illustrated, a projection 42 can remain on the receptacle 1 or on the lateral surface 11 thereof, wherein the fracture surface 131 runs on the projection 42. In particular, as also in the example of FIG. 12, this projection 42 can be wedge-shaped. In the figure, the contour of the projection 42 is highlighted by a white line. Such a projection 42 is particularly well suited for orienting the receptacle 1 in a suitable holder. In general, without restriction to the specific example illustrated, it is envisaged in a further development that the fracture surface 131 runs at least partially on a projection 42, wherein the projection 42 can preferably also be of wedge-shaped design. Such a projection can also be present in the case of a continuous fracture surface 131 which extends over the entire length of the receptacle 1. Accordingly, it is envisaged in a further development that the parting surface 13 comprises a fracture surface 131, wherein the fracture surface 131 runs at least partially on a projection 42, wherein the projection 42 can also be of wedge-shaped design. This feature of the wedge-shaped projection 42 can be present, in particular, when the fracture surface 42 is shorter than the receptacle 1.

FIGS. 13a-13b shows light microscope images featuring an intermediate product 40 in the form of a glass plate 20 in a plan view of the side faces 36, 38 of the glass plate 20 and correspondingly of the different end faces 9 and 10 of a receptacle 1 connected by a web 14 to a holding section 32. FIGS. 13a-13b is also an example of non-round receptacles 1. The receptacle 1 illustrated has the shape of a flattened body, in which the channels 7 are arranged next to one another in a line. Here, the width of the receptacle 1 can be considered to be a transverse dimension. FIGS. 13a-13b show the glass plate 20, each taken in a plan view of the opposite side faces 36, 38 of the glass plate 20, and therefore end face 9 of the receptacle 1 can be seen in FIG. 13a and end face 10 thereof can be seen in FIG. 13b. In FIG. 13b, the web 14 can be seen as a continuous connection. In contrast, the web 14 on the opposite side of the glass plate 20 is interrupted by a recess 140. In order to produce such a recess 140, it is possible, for example, to insert a trench 44 running transversely to the web 14 during the structuring of the glass plate 20. Therefore, in a further development of the intermediate product 40, without restriction to the specific example illustrated, it is envisaged that the web 14 has a height which is reduced at least in some section or sections relative to the thickness of the glass plate 20, wherein a recess 140 is introduced into the web 14, which recess reduces the height of the latter relative to the thickness of the glass plate 20.

Figures 14, 15, 16:
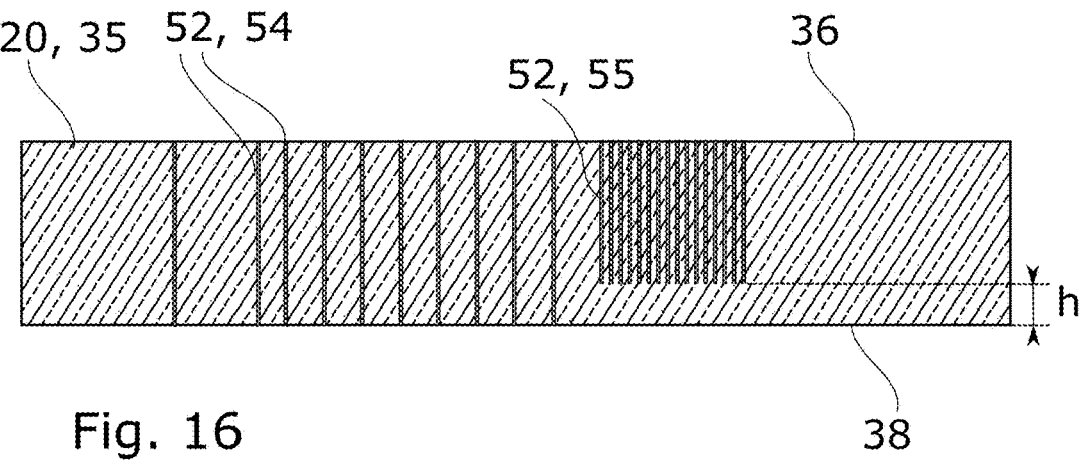
FIG. 14 shows an intermediate product in a perspective view.
FIG. 15 shows a structured glass plate in a sectional view.
FIG. 16 shows a glass plate machined with the ultra-short-pulse laser in a sectional view.

FIG. 14 shows the intermediate product 40 with the glass plate 20 once again as a sketch in a perspective view for the sake of clarification. FIG. 15 furthermore shows the structured glass plate 20 of the intermediate product 40 in a sectional view cutting through the recess 140. It can be seen from FIGS. 14 and 15 that the height of the web 14 is reduced by the recess 140. The recess 14 can preferably reduce the web height to a greater extent than is shown in the purely schematic illustration of FIG. 14. In the illustration of FIG. 15, the remaining height h of the web 14 is already less than half the thickness of the glass plate 20. Thus, the recess 140 preferably has a depth of at least half the thickness of the glass plate 20. In order not to reduce the stability too far, the depth of the recess 140 according to yet another further development is at most ⅘, preferably at most ¾, of the thickness of the glass plate 20 for glass thicknesses of up to 1 mm. In the case of glass thicknesses from 1 mm to 5 mm and more, it is also possible for the recess 140 to have a depth of up to ⁹⁄₁₀ of the glass thickness, but this is at least 100 μm, irrespective of the glass thickness. As explained with reference to FIG. 13a, FIG. 13b, and FIG. 14, the glass plate 20 can generally have a trench 44, which is introduced into one of the side faces 36, 38 of the glass plate 20 and intersects the web 14, with the result that the height of the web 14 is reduced relative to the thickness of the glass plate 20.

An intermediate product 40 and a receptacle 1 of the kind which is described by way of example with reference to FIG. 11 to FIG. 15, which are distinguished by the fact that the web height is reduced relative to the thickness of the glass plate, or that the length of the fracture surface 131 is reduced relative to the length of the receptacle 1, can generally be produced by means of a further development of the laser-supported etching method described above. As described above, the method envisages that the laser beam 51 of an ultra-short-pulse laser 50 is moved over the glass plate 20 along a predetermined path 23, with the result that mutually adjacent local areas of damage 52 lined up along this path 23 are introduced, and wherein subsequently the glass plate 20 is exposed to an etching medium, with the result that the local areas of damage 52 are expanded by the etching medium, and the glass plate 20 is thereby divided along path 23, wherein the path 23 runs in such a way that it contains the contour of a receptacle 1, which is connected to a holding section 32 via a web 14, and wherein a section 34 of the glass plate 20 is detached by the etching and division, with the result that a glass element 35 with the holding section 32 and the receptacle 1 connected to the latter via the web 14 is obtained. With these steps, the intermediate product 40 is obtained, wherein the receptacle 1 can then be detached by dividing the web 14. A further development of the method now provides for local areas of damage 54 to be introduced by means of the ultra-short-pulse laser, the said areas having a length which is reduced relative to the thickness of the glass plate 20 or ending before one of the side faces 38, 36. In this connection, FIG. 16 shows a glass plate 20 machined by means of the ultra-short-pulse laser in a sectional view. For clarification, the glass plate 20 and the section are selected in such a way that, after etching, an intermediate product 40 corresponding to the example of FIG. 15 would be obtained. As a particular preference, the local areas of damage 52 are of filament-shaped design and form narrow channels which extend into the glass plate 20 transversely, preferably perpendicularly, to the side faces 36, 38. In order to produce the contour with the receptacle 1 in the opening surrounding the latter in the glass plate, as well as the channels 7 for receiving the light guides, local areas of damage in the form of filaments 54 that pass through the glass plate 20 from one side face 36 to the opposite side face 38 are introduced. These are produced next to each other, following the contour provided. In the view of FIG. 16, the respective contour lines are cut, and therefore only a single filament 54 is visible in each case. In order to produce the recess 140, local areas of damage 52 in the form of filaments 55 of shortened length that end within the glass plate 20 are introduced sufficiently close together in one or more lines. These start from one of the side faces 36, 38, in the example side face 36, and end in the interior of the glass plate 20, in this case therefore before side face 38. During etching, a recess 140 of a depth which substantially corresponds to the length of the filaments 55 is thereby produced.

Without restriction to the example illustrated, a further development of the method is in general provided, in which local areas of damage 52 are introduced by means of the laser beam 51 along at least one predetermined path, said areas of damage having the form of filaments 54 which pass completely through the glass plate 20, and in which, in addition, local areas of damage 52 in the form of filaments 55 ending within the glass plate 20 are introduced next to one another, wherein a recess 140 is produced by the subsequent etching in the region of the filaments 55 ending within the glass plate 20, which recess reduces the height of the web connecting the receptacle 1 to the holding section 32 relative to the thickness of the glass plate 20.

The method for producing cavities or recesses is also described in DE 10 2018 110 211 A1, the disclosure of which with regard to the production of a recess or cavity is also made the subject matter of this disclosure in its entirety.

It is apparent to a person skilled in the art that the embodiments of the receptacle 1, its production and the intermediate product 40 are not limited to the specific examples shown in the figures. Thus, the various embodiments can also be combined with one another. The intermediate product 40 is, inter alia, not limited to a shape with receptacles 1 held in individual openings 24 of a holding section 32 by webs 14. Many other configurations are also conceivable here, such as, for example, a strip-shaped holding section 32 where the webs 14 with the receptacles 1 project freely outwards. Such an embodiment can be advantageous, for example, to enable the receptacles 1 to be gripped, broken off and removed particularly easily.

LIST OF REFERENCE SIGNS

| | |
|---|---|
| 1 | Receptacle |
| 2 | Glass part |

-continued

| | |
|---|---|
| 3 | Light-guiding fibre |
| 4 | Camera |
| 5 | Light guide |
| 6 | Wall between adjacent channels 7 |
| 7 | Channel in 1 |
| 8 | Central channel |
| 9, 10 | End face of 1 |
| 11 | Lateral surface |
| 13 | Parting surface |
| 14 | Web |
| 15 | Flattened portion |
| 16 | Depression |
| 17 | Taper |
| 18 | Perimeter |
| 20 | Glass plate |
| 21 | Cell |
| 22 | Blank for 1 |
| 23 | Path, contour of initial laser machining |
| 24 | Opening |
| 25 | Starting contour |
| 26 | Etching distance, etching removal |
| 27 | Final contour |
| 32 | Holding section |
| 50 | Ultra-short-pulse laser |
| 34 | Section of 20 |
| 35 | Glass element |
| 36, 38 | Side faces of 20, 40 |
| 40 | Intermediate product |
| 42 | Projection |
| 44 | Trench |
| 51 | Laser beam |
| 52 | Local area of damage |
| 53 | Lens |
| 54 | Filament passing through the glass plate 20 |
| 55 | Filament ending within the glass plate 20 |
| 70 | Opening of 7 |
| 100 | Longitudinal dimension of 1 |
| 101 | Transverse dimension of 1 |
| 102 | Wall thickness of 6 |
| 103 | Transverse dimension/diameter of 7 |
| 131 | Fracture surface |
| 132 | Parting surface section without fracture surface |
| 140 | Recess in 14 |
| 400 | Camera sensor |

What is claimed is:

1. A receptacle for a plurality of light-guiding fibres, comprising:

a glass part having a first end face, a second end face, a plurality of rectilinear channels extending between the first and second end faces, and a lateral surface between the first and second end faces along a longitudinal direction, wherein the glass part has a length defined between the first and second end faces, the length being greater than a largest transverse dimension of the glass part, wherein the plurality of rectilinear channels are each open at least at the first end face or the second end face so that the light-guiding fibres are receivable therein, respectively, wherein the plurality of rectilinear channels have a channel length that is greater than a channel transverse dimension, and wherein the lateral surface has a parting surface thereon.

2. The receptacle of claim 1, wherein the parting surface comprises a fracture surface.

3. The receptacle of claim 2, wherein the fracture surface extends along only part of the length.

4. The receptacle of claim 2, wherein the fracture surface is adjacent to the first or second end faces.

5. The receptacle of claim 2, wherein the lateral surface comprises a projection and the fracture surface runs at least partially on the projection.

6. The receptacle of claim 1, wherein the parting surface is elongate and runs in the longitudinal direction.

7. The receptacle of claim 1, wherein the plurality of rectilinear channels comprise etched surfaces.

8. The receptacle of claim 1, wherein the lateral surface comprises an etched surface.

9. The receptacle of claim 1, further comprising a feature selected from a group consisting of: a number of the plurality of rectilinear channels comprises from 2 to 40 channels, a number of the plurality of rectilinear channels comprises from 2 to 20 channels, at least one of the plurality of rectilinear channels comprises a blind hole, a rectilinear channel that runs obliquely to the longitudinal direction, a flattened portion of the lateral surface extending in the form of a strip in the longitudinal direction, a depression in the lateral surface extending in the form of a strip in the longitudinal direction, the parting surface running within a flattened portion of the lateral surface extending in the form of a strip in the longitudinal direction, the parting surface running within a depression in the lateral surface extending in the form of a strip in the longitudinal direction, the parting surface lying within a perimeter around a contour of the first or second end faces, and any combinations thereof.

10. The receptacle of claim 1, wherein the parting surface is arranged on a web running in the longitudinal direction.

11. The receptacle of claim 1, wherein the plurality of rectilinear channels, when considered in a plan view of the first or second end faces, comprise a feature selected from a group consisting of: a hexagonal arrangement, an arrangement distributed annularly around a central channel, run parallel to one another, and a channel configured to receive a camera, and a channel configured to receive an optical sensor.

12. The receptacle of claim 1, wherein the glass part comprises glass that is opaque at least in a partial range of a spectral range from 1000 nm to 350 nm.

13. The receptacle of claim 1, wherein the glass part comprises glass that is opaque at least in a partial range of a spectral range from 400 nm to 750 nm.

14. A receptacle for a plurality of light-guiding fibres, comprising:

a glass part having a first end face, a second end face, a plurality of rectilinear channels extending between the first and second end faces, and a lateral surface between the first and second end faces along a longitudinal direction, wherein the glass part has a length defined between the first and second end faces, the length being greater than a largest transverse dimension of the glass part, wherein the plurality of rectilinear channels are open at the first end face so that the light-guiding fibres are receivable therein, respectively, wherein the plurality of rectilinear channels have a channel length that is greater than a channel transverse dimension, and wherein the lateral surface is a fracture surface that extends along only part of the length.

15. The receptacle of claim 14, wherein the fracture surface is adjacent to the second end face.

16. The receptacle of claim 14, wherein the fracture surface has a surface width, a surface length, and an aspect ratio of the surface width to the surface length that is at least 1:3.

17. The receptacle of claim 14, wherein the fracture surface has a surface width, a surface length, and an aspect ratio of the surface width to the surface length that is at least 1:10.

* * * * *